(12) United States Patent
Joffe et al.

(10) Patent No.: US 6,975,706 B1
(45) Date of Patent: Dec. 13, 2005

(54) CAPACITANCE MEASUREMENT-BASED MECHANISM FOR LOCATING OPEN TELECOMMUNICATION LINE FAULT

(75) Inventors: Daniel M. Joffe, Owens Crossroads, AL (US); Fred T. Chu, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 168 days.

(21) Appl. No.: 10/663,631

(22) Filed: Sep. 16, 2003

Related U.S. Application Data

(63) Continuation-in-part of application No. 10/403,321, filed on Mar. 31, 2003, which is a continuation-in-part of application No. 10/246,368, filed on Sep. 18, 2002, now abandoned.

(51) Int. Cl.[7] .......................... H04M 1/24; H04M 3/08; H04M 3/22
(52) U.S. Cl. .............................. 379/22.03; 379/14.01; 379/29.03; 379/30
(58) Field of Search .............................. 379/1.01, 1.04, 379/14.01, 15.03, 22.01–22.05, 22.07, 24–25, 379/28, 27.01–27.04, 29.03–29.05, 32.04, 379/30

(56) References Cited

U.S. PATENT DOCUMENTS

| | | | | |
|---|---|---|---|---|
| 5,111,497 | A | * | 5/1992 | Bliven et al. ............ 379/27.01 |
| 5,774,316 | A | | 6/1998 | McGary et al. ............... 361/42 |
| 6,868,357 | B2 | * | 3/2005 | Furse ......................... 702/108 |

* cited by examiner

*Primary Examiner*—Duc Nguyen
(74) *Attorney, Agent, or Firm*—Allen, Dyer, Doppelt, Milbrath & Gilchrist, P.A.

(57) ABSTRACT

To locate an open fault along a telecommunication wireline pair, a prescribed frequency tone is coupled to the wireline pair by way of a center tap of the transformer through which a line card is coupled to a subscriber loop. The line card's analog front end conducts capacitance to ground measurements on the tip and ring segments of the wireline pair. From these measurements, sum and difference distance values of respective tip and ring conductor lengths are derived. The sum and difference distance values are then processed to calculate the distance to the fault.

10 Claims, 2 Drawing Sheets

TABLE 2

| BINDER/PAIR | Ctgsm (pF/ft) |
|---|---|
| 2/9 | 23.28 |
| 3/18 | 23.20 |
| 4/5 | 23.54 |

TABLE 1

| PAIR NUMBER | Ctrg (pF/ft) | Ctgsm (pF/ft) | Ctg=Crg (pF/ft) | Ctr (pF/ft) |
|---|---|---|---|---|
| 1 | 36.68 | 23.68 | 18.34 | 7.53 |
| 9 | 35.64 | 23.41 | 17.82 | 8.15 |
| 18 | 36.47 | 23.48 | 18.24 | 7.363 |
| 25 | 37.97 | 24.37 | 18.99 | 7.517 |
| AVERAGES | 36.69 | 23.74 | 18.35 | 7.64 |

TABLE 3

| LENGTH | Ctrg (pF PER FOOT) AT f=250 Hz | Ctrg (pF PER FOOT) AT f=1 kHz | Ctrg (pF PER FOOT) AT f=2 kHz |
|---|---|---|---|
| 2000 FEET | 39.17 | 38.77 | 38.77 |
| 4000 FEET | 36.89 | 36.51 | 36.51 |
| 6000 FEET | 35.55 | 34.78 | 34.38 |
| 8000 FEET | 33.96 | 33.22 | 31.73 |
| 10000 FEET | 32.66 | 31.59 | 29.14 |

CAPACITANCE MEASUREMENT-BASED MECHANISM FOR LOCATING OPEN TELECOMMUNICATION LINE FAULT

CROSS-REFERENCE TO RELATED APPLICATION

The present application is a continuation-in-part of co-pending U.S. application Ser. No. 10/403,321, filed Mar. 31, 2003, (hereinafter referred to as the '321 application), which is a continuation-in-part of U.S. application Ser. No. 10/246,368, filed Sep. 18, 2002, now abandoned, by F. Chu et al., entitled: "DSL Line Card Echo Canceler-Based Mechanism For Locating Telecommunication Line Fault," each application being assigned to the assignee of the present application and the disclosure of which are incorporated herein.

FIELD OF THE INVENTION

The present invention relates in general to telecommunication systems, and is particularly directed to a digital subscriber loop (DSL) line card-associated mechanism that is operative to conduct capacitance measurements on the wireline to which the line card is connected, and determine from such measurements the location of an open circuit on the wireline pair.

BACKGROUND OF THE INVENTION

With the proliferation of DSL technology, telecommunication services providers have found themselves confronted with the problem that the cost of deployment and maintenance of a DSL circuit may exceed the cost of the DSL equipment shelf. A common maintenance issue involves resolving a service-impairing fault that has occurred somewhere along a DSL circuit. To this end, when responding to a DSL trouble call, one or multiple (types of) craftspersons or service technicians may be dispatched to one or more locations along the DSL circuit. For example, a fault occurring within the central office (CO) proper will be handled by a CO technician, while a facility technician will be assigned to resolve faults that occur along the cable plant between the central office and the customer site; further, a special services installation and maintenance technician has the responsibility of resolving a problem at the customer premises.

In order to avoid the unwanted expense and delay associated with sending different technicians to different portions of the DSL circuit, it is desirable that the location of the fault be identified prior to dispatching service personnel to correct the problem. Moreover, once a technician has arrived at a potential fault location along the wireline, it may be necessary for the technician to connect and operate expensive test equipment to pinpoint the exact location and type of fault.

Although the industry is in the process of developing techniques for detecting the type of fault and estimating their location along the DSL link, schemes that have been proposed to date are computationally intensive, require dedicated pieces of test equipment and are not readily suited for installation on currently deployed equipment (e.g., DSL line cards).

Advantageously, the invention disclosed in the above-referenced '321 application addresses these shortcomings by making use of the digital echo canceler that is resident in the transceiver of a conventional DSL line card, to estimate changes in echo path both upstream and downstream of an apparent line fault. The location of the peak of the echo channel response is correlated directly to the location and the type of the fault. As a non-limiting example, the invention disclosed in the '321 application may be used to locate, in prescribed (e.g., 250 ft) increments, an open or short in the tip and ring conductors of a metallic wireline pair up to 7.5 kft away from the central office.

An open fault in only one of the conductors of the wireline pair is relatively difficult to detect, since it manifests itself as a very large return signal, irrespective of the distance to the fault. Indeed, there is very little differentiation in capacitance distance, when this type of faulty loop is coupled to an LCR meter and the loop capacitance is measured differentially. Although the response characteristic of an open single conductor fault is readily discernible, it is difficult to identify anything with less than two kft of resolution. To address this problem, the capacitance of the loop may be measured as referenced to ground per conductor. Such a conductor-to-ground measurement can handle this loop fault more effectively than the differential signal sensed by the echo canceler mechanism.

SUMMARY OF THE INVENTION

The present invention is directed to a mechanism that is operative to conduct capacitance-to-ground measurements on a wireline pair to the determine location of an open circuit on the wireline pair. This is accomplished by adding center-tap excitation to existing line card circuitry, so that its analog front end is able to measure the response. The transfer function from a driven center-tap is responsive to the difference between tip-to-ground and ring-to-ground capacitances (impedances). The magnitude of the response is proportional to both the values of respective wireline segment impedances, and their difference.

If the impedances are identical, then the voltage detected by the analog front end as a result of center-tap excitation will be zero. This corresponds to the case where both tip and ring conductors have the same length. If the impedances are widely different, as is the the case where only one conductor of the wireline pair is open, then the detected voltage will be relatively large. Essentially, what is being measured is longitudinal balance. Thus, this measurement provides an indication of the difference in the lengths of the tip and ring conductors. An additional measurement of the admittance seen to ground when driving the center-tap provides an indication of the sum of the lengths of the tip and ring conductors. Given the the sum and difference values allows the respective wireline distances to the fault to be located.

DETAILED DESCRIPTION

Figures 1, 2, 3, 4:
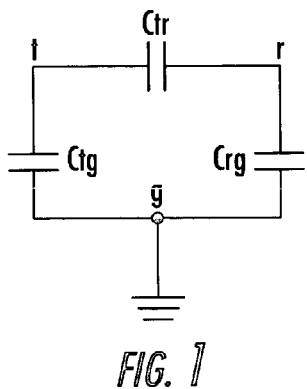
FIG. 1 is a schematic model of the capacitance parameters of a telecommunication wireline pair.
FIG. 2 contains a Table 1 which tabulates results of capacitance measurements at a transmission frequency of 250 Hz conducted on four pairs of wires in a 4000-foot length of cable containing 100 pairs of 26 AWG aerial cable.
FIG. 3 contains a Table 2 which tabulates the results of measuring capacitance from tip-to-ground with the ring conductor open for one pair in each of the other binder groups.
FIG. 4 contains a Table 3 which tabulates capacitance Ctrg which is the capacitance from tip and ring, tied together, to ground in pF per foot as a function of length and measurement frequency.

Before detailing the new and improved open circuit location mechanism of the present invention, it should be observed that the invention resides primarily in prescribed modular arrangements of conventional communication circuits and associated signal processing components and attendant supervisory circuitry therefor, that controls the operations of such circuits and components. In a practical implementation that facilitates their incorporation into existing printed circuit cards of telecommunication equipment, these modular arrangements may be readily implemented as field programmable gate array (FPGA)-implementation, application specific integrated circuit (ASIC) chip sets, programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

In order to facilitate an appreciation of the capacitance measurement-based open circuit fault location mechanism of the invention, it is initially useful to examine a model of the capacitance parameters of a typical wireline pair. As pointed out above, the wireline pair in question is typically contained within a multi-wireline pair cable, with a conductive foil sheath surrounding the entire cable. Rather than model the entire cable, which constitutes a very daunting task, since an n-conductor cable contains approximately $n^2/2$ capacitors, and a 100 pair cable model has 200 wires, which yields on the order of $200^2/2=20,000$ capacitors, it is more practical to consider only one wireline pair at a time. Doing so allows the cable pair to be modeled as a three-capacitor circuit shown in FIG. 1.

In the illustrated three capacitor wireline pair model, the g terminal represents the conductive foil sheath surrounding the cable (which is usually connected to ground), Ctg corresponds to the capacitance from tip-to-ground, Crg is the capacitance from ring-to-ground, and Ctr is the capacitance from tip-to-ring. The multi-capacitor model of FIG. 1 implies the need for some care in measuring capacitance. For example, if a capacitance meter is placed between tip and ground, it does not simply measure Ctg. It measures Ctg in parallel with the series combination of Ctr and Crg. A similar situation applies to Crg. Thus, it is necessary to measure the actual cable to determine the values of the three capacitors in the model.

The capacitance values Ctr, Ctg, and Crg may be calculated based on two experimental measurements, in particular by measuring Ctrg, which is the capacitance from tip and ring, tied together, to ground (cable sheath), and by measuring Ctgsm, corresponding to the capacitance from tip-to-ground with the ring conductor open. It may also be noted that, due to balance considerations, an equivalent measurement of Crgsm—the capacitance from ring-to-ground with tip open—may be determined.

A relatively good telecommunications cable will have longitudinal balance on the order of 40 dB or better. This means that Ctg and Crg must be very nearly equal. To measure Ctg and Crg, the tip and ring terminals may be combined or shorted together, and the capacitance measured from the combined terminal to ground. This measurement may be termed Ctrg, so that Ctrg may be defined as:

a. $Ctrg=Ctg/2=Crg/2$         (1)

Ctr is the capacitance from tip-to-ring in the model of FIG. 1, and is different than the capacitance that would be measured from tip-to-ring due to the influence of Ctg and Crg. To find Ctr using ground referenced capacitance measurements, Ctgsm may be defined as the capacitance measured with one lead on tip and one lead on ground (Ctgsm standing for capacitance tip-to-ground in a simple measurement).

Looking at the equivalent circuit, it can be readily seen that:

a. $Ctgsm=Ctg+(Ctr*Crg)/(Ctr+Crg)$         (2)

Solving equation (2) for Ctr yields:

a. $Ctr=(Ctg*(Ctgsm-Ctg))/(2*Ctg-Ctgsm))$         (3)

Alternatively, Ctr may be expressed solely in terms of the experimentally measured Ctrg and Ctgsm as:

a. $Ctr=(Ctrg*(2*Ctgsm-Ctrg))(4*(Ctrg-Ctgsm))$         (4)

Table 1 in FIG. 2 tabulates results of capacitance measurements at a transmission frequency of 250 Hz conducted on four pairs of wires in a 4000-foot length of cable containing 100 pairs of 26 AWG aerial cable. To confirm the accuracy of the current approach, the capacitance measured from tip-to-ring, termed Ctr_measured, which is different from Ctr in the model of FIG. 1, was calculated. Namely, a. $Ctr\_measured=Ctr+(Ctg*Crg)/(Ctg+Crg)$         (5)

Using the averages from Table 1, Ctr_measured becomes:

a. $Ctr\_measured=7.64+(18.35*18.35)/(18.35+18.35)= 16.81$ pF.

This is approximately 7% greater than the published value of 15.72 pF/foot (83 nF/mile divided by 5280 feet).

In order for the capacitances to be a useful measure of cable or conductor length, they should not vary excessively as a function of the cable, pair or binder group. Ctgsm was measured for a 2 kft length of cable, measuring all 25 pairs in the same binder group of a 100 pair cable. The average capacitance was measured at a measurement frequency of 2 KHz to be 49.72 nF, which corresponds to a value of 24.86 pF per foot. The standard deviation among the 25 pairs was 0.498 pF per foot.

Table 2 of FIG. 3 tabulates the results of measuring Ctgsm for one pair in each of the other binder groups, and reveals that the variation is fairly well controlled. If it assumed that all wireline pairs within the cable fall within plus or minus four standard deviations, the length of the cable may be determined to within +/−2/25=+/−8%, which assists in narrowing the location of the open.

Capacitance may also be measured as a function of length and frequency. At low frequencies, the inductance in the line can be ignored. This results in a circuit model consisting of successive delta connections of capacitors connected by series resistors. At very low frequencies, the input impedance may be approximated as a pure capacitance that is proportional to length. At some point, the cable will become too long or the required frequency too low, and the direct proportionality of the measurement will become compromised.

The present inventors undertook laboratory measurements to determine the range of applicability of the model, where capacitance is directly proportional to conductor length. Ctrg was measured at the indicated frequency listed in Table 3 shown in FIG. 4. This table reveals that the approximation improves as frequency goes lower; however, even at 250 Hz, the approximation is not perfect. At 250 Hz, the 10,000 foot value of capacitance per foot is 83% of its 2000 foot value.

A straightforward approach to measuring a single conductor open is to directly measure the capacitance of each conductor to ground. Unfortunately, this requires a large number of relays or switches. Moreover, such an approach is not straightforward, since individually measuring Ctg or Crg in the model of FIG. 1 requires compensating for the effect of Ctr by calculation or guarding.

Figure 5:
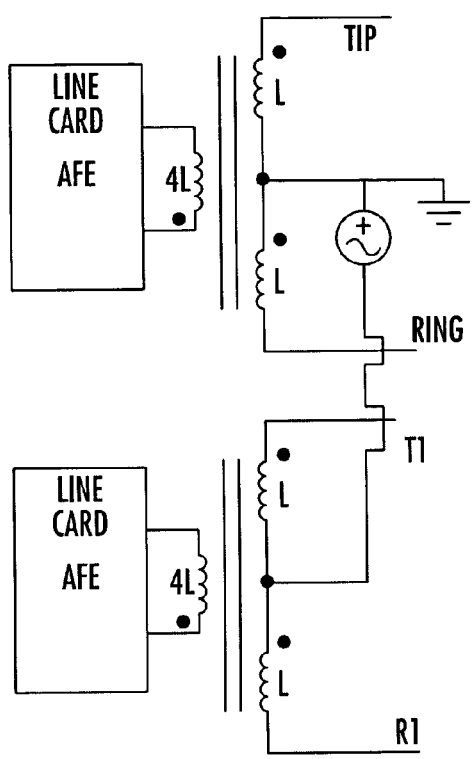
FIG. 5 shows a reduced complexity diagram of two transformers of an HDSL or HDSL-4 line card.
Figure 6:
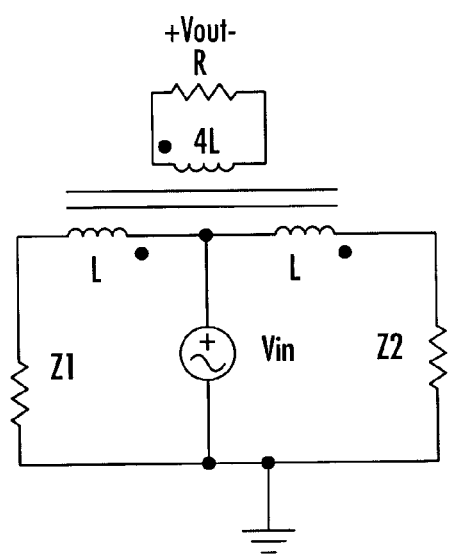
FIG. 6 shows one of the two transformers of FIG. 5.

As a more practical approach, both the sum and the difference of the conductor lengths may be measured; from this data, the length of each conductor may be determined. FIG. 5 shows a reduced complexity diagram of one of two transformers in an HDSL or HDSL-4 line card, while FIG. 6 shows one of the two transformers that is used for analysis. Z1 is the impedance from tip-to-ground, and Z2 is the capacitance from ring-to-ground. Typically, these impedances are largely capacitive. As a non-limiting example, the transformer may be a 1:1 transformer. The total inductance of the primary (analog front end (AFE) side or secondary (line side) windings is 4L. Half of the line side winding has an inductance L. The resistance R is typically 135 Ohms in an HDSL line card.

The transfer function H(s) from a driven center-tap to Vout—the voltage seen by an AFE receiver—may be derived as follows:

a. $H(s,Z1,Z2,L,R) := -2*s*L*R*(-Z2+Z1)/ 8*Z1*s^2*L^2)/(8*Z1*s^2*L^2+ (Z2*L*R+4*Z1*Z2*L)*s+Z1*Z2*R)$ (6)

The transfer function H(s) is responsive to the difference between tip-to-ground and ring-to-ground capacitances (impedances). Thus, by adding center-tap excitation to existing line card circuitry, its AFE is able to measure the response. In accordance with a non-limiting, preferred embodiment this may be readily accomplished through a selectively controlled switch, which is operative under control of the line card's supervisory communications processor, to couple the center tap to the line card transceiver.

The magnitude of the response is proportional to both the values of Z1 and Z2, and their difference. If Z1 and Z2 are identical, then Vout—the voltage detected by the AFE as a result of center-tap excitation—will be zero. This corresponds to the case where both tip and ring conductors have the same length. If Z1 and Z2 are widely different, as is the the case where only one conductor of the wireline pair is open, then Vout will be relatively large.

For purposes of simplification, for L values in typical HDSL units, expected cable capacitances, and adequately low measurement frequencies, the measurements will always operate in the region where the s and $s^2$ denominator terms are not important. Expressing this in terms of admittances (Y1=1/Z1 and Y2=1/Z2), in the rising region of frequency response, the transfer function H(s) may be simplified as:

a. $Hsimp(s,Y1,Y2,L)=2*s*L*(Y1-Y2)$ (7)

If Z1 and Z2 are capacitive, this increases with a second order slope as:

a. $Hsimp(s,C1,C2,L)=2*s^2*L*(C1-C2)$ (8)

This can be related to the difference of the lengths of the tip and ring conductors (d1 and d2) as:

a. $Hsimp(w,d1,d2,L)=2*\omega^2*L* Ctog\_per\_foot*(d1-d2)$ (9)

If vout/vin is measured at a frequency f, termed lbr, the difference in lengths of the two conductors may be determined as:

a. $d1-d2=lbr/(8n^2f^2L*Ctog\_per\_foot)$ (10)

Essentially, what is being measured is longitudinal balance. Thus, this measurement provides an indication of the difference in lengths of the two conductors.

The impedance Zin as seen by the source may be defined as:

a. $Zin=(8*Z1*s^2*L^2+(L*Z2*R+Z1*L*R+ 4*Z1*Z2*L)*s+Z1*Z2*R)/(16*s^2L^2+ (4*Z1*L+4*Z2*L+r*L*R)*s+Z1*R+Z2*R)$ (11)

In the rising region, equation (11) may be simplified as:

a. $Zinsimp=Z1*Z2/(Z1+Z2)$ (12)

Replacing the impedances by the inverse of their associated admittances, i.e., Z1 by 1/Y1 and Z2 by 1/Y2, it can be seen that the admittance seen by the source in that frequency region is:

a. $Yinsimp=Y1+Y2=s*C1+s*C2=(j*\omega*(C1+C2))$ (13)

This can be related to the overall length of the tip and ring conductors (ignoring the capacitance to ground in the remote terminal unit) as:

a. $Yinsimp=j*\omega*Ctog\_per\_foot*$ (tip_conductor_length

+b. ring_conductor_length) (14)

Solving equation (14) in terms of the sum of d1 and d2 produces equation (15) as:

a. $d1+d2=Yinsimp/Ctog\_per\_foot*2*n*f$ (15)

Having found the sum and difference values d1+d2 and d1−d2, respectively, and calling d1+d2=lengthsum and d1−d2=lengthdiff, a. then $d1$=(lengthsum+lengthdiff)/2, (16)

b. $d2$=(lengthsum−lengthdiff)/2. (17)

As will be appreciated from the foregoing description, through a relatively minor modification of existing line card circuitry, specifically by adding a controlled connection between the line card transceiver and the center tap of the transformer through which the line card is coupled to the subscriber loop, the line card's analog front end is able to conduct capacitance measurements on the tip and ring pair, from which sum and difference distance values to the location of an open circuit fault on the line may be determined. From these sum and difference distance values, the actual distance to the fault may be readily calculated.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of determining the location of an open fault along a wireline, serving digital subscriber equipment at a location remote with respect to a central office facility, said location of said fault being determined relative to a line card installed in said central office facility, said method comprising the steps of:
   (a) applying an electrical stimulus to said wireline from said line card; and
   (b) at said line card, measuring capacitance parameters of said wireline in response to said electrical stimulus applied in step (a), and determining from said measured capacitance parameters the distance from said line card to said open fault; and wherein
   step (a) comprises applying a prescribed frequency to said wireline, and step (b) comprises measuring admittances of tip and ring portions of said wireline to derive a sum distance value representative of the sum value of conductor lengths of tip and ring portions of said wireline and the difference value between conductor lengths of said tip and ring portions of said wireline, and processing said sum and difference values to determine the distance from said line card to said open fault.

2. The method according to claim 1, wherein step (a) comprises driving a center-tap location of a transformer coupling line card circuitry to said wireline with said prescribed frequency.

3. The method according to claim 1, wherein step (b) comprises measuring longitudinal balance to provide an indication of the difference in lengths of said tip and ring conductors.

4. A method of determining the location of an open fault along a wireline, serving digital subscriber equipment at a location remote with respect to a central office facility, said location of said fault being determined relative to a line card installed in said central office facility, said method comprising the steps of:
   (a) applying an electrical stimulus to said wireline from said line card; and
   (b) at said line card, measuring capacitance parameters of said wireline in response to said electrical stimulus applied in step (a), and determining from said measured capacitance parameters the distance from said line card to said open fault, and and wherein
   step (b) comprises conducting capacitance to ground measurements of respective tip and ring conductors of said wireline in response to said electrical stimulus applied in step (a), and deriving therefrom a sum distance value representative of the sum value of conductor lengths of tip and ring portions of said wireline to said fault and the difference value between conductor lengths of said tip and ring portions of said wireline to said fault.

5. A method of determining the location of an open fault along a telecommunication tip and ring wireline pair, serving subscriber equipment at a location remote with respect to a central office facility, said location of said fault being determined relative to a line card installed in said central office facility, said method comprising the steps of:
   (a) applying a prescribed frequency signal to said wireline from said line card; and
   (b) at said line card, conducting tip-to-ground and ring-to-ground capacitance measurements in response to said prescribed frequency signal applied in step (a), and determining from said measured capacitance parameters the distance from said line card to said open fault; and wherein
   step (b) comprises measuring impedances of tip and ring wireline portions of said wireline pair and deriving therefrom a sum distance value representative of the sum value of conductor lengths of said tip and ring wireline portions and the difference value between conductor lengths of said tip and ring wireline portions, and processing said sum and difference values to determine the distance from said line card to said open fault.

6. The method according to claim 5, wherein step (a) comprises driving a center-tap location of a transformer coupling line card circuitry to said wireline with said prescribed frequency signal.

7. The method according to claim 5, wherein step (b) comprises measuring longitudinal balance to provide an indication of the difference in lengths of said tip and ring wireline portions.

8. An arrangement for determining the location of an open fault along a wireline serving subscriber equipment at a location remote with respect to a central office facility, said location of said fault being determined relative to a subscriber loop line card installed in said central office facility, comprising:
   an electrical stimulus generator within said central office facility and being operative to apply a prescribed signal to said wireline; and
   a line card measurement unit installed in said line card, which is operative to conduct capacitance measurements of said wireline in response of application to wireline of said electrical stimulus by said electrical stimulus generator, and derive therefrom the distance from said line card to said open fault; and wherein
   said electrical stimulus generator is operative to apply prescribed frequency to said wireline, and said line card measurement unit is operative to measure admittances of tip and ring portions of said wireline to derive a sum distance value representative of the sum value of conductor lengths of tip and ring portions of said wireline and the difference value between conductor lengths of said tip and ring portions of said wireline, and to process said sum and difference values to determine the distance from said line card to said open fault.

9. The arrangement according to claim 8, wherein said electrical stimulus generator is operative to drive a center-tap location of a transformer coupling line card circuitry to said wireline with said prescribed frequency.

10. An arrangement for determining the location of an open fault along a wireline serving subscriber equipment at a location remote with respect to a central office facility, said location of said fault being determined relative to a subscriber loop line card installed in said central office facility, comprising:
   an electrical stimulus generator within said central office facility and being operative to apply a prescribed signal to said wireline; and
   a line card measurement unit installed in said line card, which is operative to conduct capacitance measurements of said wireline in response of application to wireline of said electrical stimulus by said electrical stimulus generator, and derive therefrom the distance from said line card to said open fault, and wherein
   said line card measurement unit is operative to conduct capacitance to ground measurements of respective tip and ring conductors of said wireline in response to said electrical stimulus, and to derive therefrom a sum distance value representative of the sum value of conductor lengths of tip and ring portions of said wireline to said fault and the difference value between conductor lengths of said tip and ring portions of said wireline to said fault.

* * * * *